United States Patent [19]

Elfers

[11] 4,125,508

[45] Nov. 14, 1978

[54] METHOD OF MAKING A FLOCCULANT COMPOSITION

[75] Inventor: Günther H. Elfers, Grosse Ile Township, Wayne County, Mich.

[73] Assignee: BASF Wyandotte Corporation, Wyandotte, Mich.

[21] Appl. No.: 877,627

[22] Filed: Feb. 14, 1978

Related U.S. Application Data

[63] Continuation of Ser. No. 807,247, Jun. 16, 1977, abandoned.

[51] Int. Cl.$^2$ .................. C08K 5/06; C08K 5/01; C08J 3/02; C08F 218/00
[52] U.S. Cl. .................. 260/33.2 R; 210/54; 260/29.6 WQ; 526/216; 526/303; 526/317; 526/909; 260/34.2
[58] Field of Search .................. 260/33.2 R, 33.4 R, 260/34.2, 23 EM, 29.6 WQ

[56] References Cited

U.S. PATENT DOCUMENTS

| | | | |
|---|---|---|---|
| 3,532,663 | 10/1970 | Nicks et al. | 260/34.2 |
| 3,580,880 | 5/1971 | Clarke et al. | 260/29.6 R |
| 3,666,710 | 5/1972 | Makhlouf et al. | 260/34.2 R |
| 3,691,123 | 9/1972 | Clarke et al. | 260/33.2 R |
| 3,717,605 | 2/1973 | Osmond | 260/34.2 |
| 3,915,920 | 10/1975 | Slovinsky | 260/34.2 |
| 3,925,295 | 12/1975 | Osborn et al. | 260/34.2 |
| 3,935,155 | 1/1976 | Osmond et al. | 260/33.4 R |
| 3,981,839 | 9/1976 | Asher et al. | 260/34.2 |
| 3,985,700 | 10/1976 | Nicks et al. | 260/34.2 |
| 4,052,353 | 10/1977 | Scanley | 260/29.6 WQ |

FOREIGN PATENT DOCUMENTS

| | | | |
|---|---|---|---|
| 1,354,698 | 5/1974 | United Kingdom | 260/34.2 |
| 1,373,531 | 11/1974 | United Kingdom | 260/34.2 |

*Primary Examiner*—Herbert J. Lilling
*Attorney, Agent, or Firm*—John W. Linkhauer; Bernhard R. Swick; Robert E. Dunn

[57] ABSTRACT

There is practiced a four-step procedure, according to which the acrylamide or the like and, if desired, other ingredients, is first polymerized in a water-in-oil emulsion where the oil phase consists of a hydrocarbon solvent in the presence of an appropriate quantity of suitable surfactant so as to produce particles of a desired size, then water is azeotropically removed, and then a suitable glycol or glycol ether is added, following which the hydrocarbon solvent used in the polymerization reaction is removed. This makes it possible to obtain a composition of matter which contains at least 10 weight percent of active flocculant ingredient, and more usually about 20 percent, suspended in a medium which is entirely water-soluble. Such flocculant compositions dissolve readily in water, yet they can be obtained, according to the method of the invention, in a manner considerably less expensive than any process which necessitates the grinding of a solid flocculant material into finely divided form.

8 Claims, No Drawings

METHOD OF MAKING A FLOCCULANT COMPOSITION

CROSS-REFERENCE TO RELATED APPLICATION

This application is a continuation of my earlier-filed copending application Ser. No. 807,247, filed June 16, 1977, and now abandoned.

BACKGROUND OF THE INVENTION

1. Field of the Invention

This invention relates to a method for making a flocculant composition.

2. Description of the Prior Art

The polyacrylamide-type flocculants have been known for at least about 20 years. They have been made by polymerizing acrylamide alone or with a comonomer, such as acrylic acid in the case that a flocculant of the anionic type is desired, or with, e.g., dimethylaminoethyl methacrylate (DMAEMA) or diethylaminoethylacrylate (DEAEA), in the case that flocculant of cationic nature is desired. Other comonomers, such as acrylonitrile, methacrylic acid, and the like, have also been used.

The prior practices have various shortcomings.

When solution polymerization is used, it is ordinarily not possible to obtain a liquid product which contains more than about 5 to 7 percent by weight of the active-ingredient polymer. Polymers of this kind, useful as flocculants, have high molecular weights, on the order of 1,000,000 or more, and they form in water very viscous solutions, even when they are present at low concentrations such as 2 or 3 percent. The chief drawback of water-based liquid products is that they are uneconomical to store and to ship, because they must contain such a great percentage of water if they are not to become too viscous. More over, dilute polymer solutions are subject to degradation.

Solid polyacrylamide-type flocculant products have been made. They are convenient to ship and to store, but they have the drawback that they often require the use of special equipment to dissolve them in water at the site of the intended use, and in many cases, such dissolution does not happen rapidly.

Still another approach is that of U.S. Pat. No. 3,637,491, in accordance with which the polymerization is conducted in a water-in-oil emulsion, and then, with a surfactant material being provided either in the polymer-containing composition or in the water to which it is later added, the water-in-oil emulsion is then added to a larger quantity of water and the emulsion is consequently inverted, to form an oil-in-water emulsion. With this approach, it is possible to obtain a composition which provides a substantial content of polyacrylamide-type active ingredient, such as 20 or 30%, but the method has a considerable drawback in that a large proportion of oil, which is not biodegradable and is thus subject to objection under the laws and regulations concerning pollution, is necessarily present in the emulsion-type products of the kind mentioned above.

Still another approach is that of British Pat. No. 1,397,933, in which there is first made a solid flocculant, which is then ground very fine in a ball mill or the like and then added to mineral oil. Although this approach yields a liquid which is pumpable and contains the flocculant material in finely divided form, so that it can readily be dissolved in water at the point of use, this approach is not convenient and is not inexpensive. The grinding step is especially costly, and the product contains mineral oil, which is not readily biodegradable.

Summary of the Invention

According to the invention, there is provided a method which yields a product that meets the various criteria set forth above. The method involves an initial emulsion polymerization with hexane or the like forming the continuous phase of the emulsion, and with a proper quantity of surface-active agent being present in order to yield particles of desired size, and then, after the azeotropic removal of water, a suitable glycol or glycol ether is added, following which the hydrocarbon or other solvent used in the initial polymerization reaction is removed, to yield a product having the desirable properties mentioned above. This yields a product which is liquid and pumpable and contains a relatively high percentage of active ingredient, yet such product is obtained at relatively low cost, in that no expense for grinding is required.

DESCRIPTION OF THE PREFERRED EMBODIMENTS

The making of a product in accordance with the method of the present invention comprises four steps: (1) polymerization, (2) water removal, (3) addition of suitable glycol or glycol ether, and (4) removal of the hydrocarbon solvent used in the polymerization of step one.

In the polymerization step, the monomer or monomers are mixed with water, a suitable organic medium, such as cyclohexane or hexane, an initiator, and a proper proportion of surfactant, and heated, with stirring, to obtain a polymerized product of a desired fine particle size, i.e., fine enough to form a stable suspension or dispersion, and of a proper molecular weight, such as over 1,000,000. In particular, satisfactory results in respect to making a cationic flocculant have obtained by using hexane, about 65 parts by weight of acrylamide and 35 parts by weight of DMAEMA as monomers, and sorbitan monostearate as the surfactant. Particles of sufficiently fine dimensions have been obtained by using 4 grams of surfactant per 330 grams of hexane, and 38.1 grams of acrylamide together with 15.7 grams of DMAEMA.

The next step is the azeotropic removal of water. This is ordinarily done at atmospheric pressure, but pressure somewhat higher or lower may be used, if desired. It is important that the water be removed, because the presence of even relatively small proportions of water in the product will otherwise lead to the formation of viscous and relatively unmanageable compositions.

The next step, according to the present invention, is the addition of a suitable glycol or glycol ether. Satisfactory results have been obtained with the use of 222 grams of diethylene glycol diethyl ether (DGDE). It is water-soluble, high-boiling, biodegradable, compatible with the surfactant, and inexpensive, and it has a relatively high flash point. Enough of the glycol or glycol ether is added to yield a dispersion which usually contains on the order of 18 to 21 percent by weight of the active-ingredient polymer.

The final step is the removal of the hydrocarbon solvent used in the polymerization step. Preferably, this step is practiced, and it is done by distillation, either at atmospheric pressure or at a reduced absolute pressure, such as 10 millimeters of mercury absolute pressure.

There is left a dispersion which is quite stable and is completely water-soluble, and it contains a relatively great proportion (such as 10 to 30 percent by weight) of polymer which is an active ingredient serving as a flocculant. A sample of material produced as indicated above remains as a mobile and homogeneous liquid after being permitted to stand for several months or more.

Those skilled in the art will appreciate how the invention described above may be modified in various ways.

The invention is applicable to various monomers or combinations of monomers. It can be used for acrylamide alone, or for acrylamide plus DMAEMA or DEAEA if a cationic flocculant is desired, or for acrylamide plus acrylic acid or sodium acrylate if an anionic surfactant is desired. Acrylonitrile or various other acrylates or methacrylates may similarly be used.

Various solvents may be used for the initial polymerization step. Pentane, heptane, petroleum ether, cyclopentane, cyclohexane, or benzene could be used in the place of the hexane mentioned above. The solvent used in the polymerization is one that forms an azeotrope with water and is relatively low-boiling (preferably under 100 degrees centigrade at atmospheric pressure).

Other surfactants can be used in place of the sorbitan monostearate mentioned above. Sorbitan monooleate or sorbitan palmitate can be used. The surfactant selected should be soluble in the solvent and in the glycol or glycol ether used. It should have a low HLB value. One factor influencing the size of the particles which are obtained in the polymerization step is the matter of the proportion and the type of the surfactant which is used. When smaller proportions of the surfactant are used, the particles of the polymer tend to be larger. To obtain desirable results, it is necessary to use a proportion of surfactant sufficient to yield fine particles, in the general size range of 1 millimicron to several microns in diameter. If too little surfactant is used, the particles of polymer which are made are undesirably larger, and they tend to settle out. On the other hand, it is uneconomical to use any more of the surfactant that is required to obtain particles of the desired size. The surfactant is usually used at a rate of 0.5 to 2 parts by weight per 100 parts by weight of solvent. The particle size of the particles obtained in a polymerization step is also influenced by other factors, including the type and intensity of the agitation employed, the type and the proportion of the respective monomers, solvents, and other additives present during the polymerization step, and other factors.

Other materials can be used in place of diethylene glycol diethyl ether (DGDE). For example, ethers which are suitable include methyl and ethyl mono- and di-ethers of various lower ($C_2$ to $C_7$)glycols and if they are adequately dehydrated, such glycols themselves. Thus, there may be used ethylene glycol, diethylene glycol, propylene glycol, dipropylene glycol, hexylene glycol, or ethylene glycol monomethyl ether (EGME). Various liquid polyols may also be used. The chief consideratons are (1) water solubility, (2) compatibility with surfactant, and (3) boiling point sufficiently high to permit ready separation from the hydrocarbon solvent employed in the polymerization step.

There is thus produced a composition of matter which amounts to a dispersion of a finely divided flocculant product in a water-soluble liquid. The particles of the flocculant range in size from one millimicron to ten microns in maximum dimension. Such a composition constitutes a mobile liquid which lends itself readily to being applied by pumping, aspiration, or other means for conveying the liquid to a place where it may be used as a flocculant.

A fuller understanding of the present invention may be obtained from the following specific examples, which are to be interpreted as illustrative and not in a limiting sense.

EXAMPLE 1

To a three-necked flask having a capacity of one liter and equipped with a stirrer, reflux condenser, thermometer, addition funnel, Dean-Start-type trap, and a heatable water bath, there were added 132 grams of water, 4.94 grams of 98% sulfuric acid, 15.7 grams of dimethylaminoethylmethacrylate, and 38.1 grams of acrylamide. The resulting solution was adjusted to a pH of 3.5 by the addition of an aqueous solution containing 50 percent by weight of sulfuric acid. Then 330 grams of hexane, 9.4 grams of sorbitan monostearate, 0.022 grams of formic acid, and 0.044 grams of azobisisobutyronitrile were added to the solution. The mixture was stirred and was heated at 60° to 65° C under a nitrogen blanket. After 1.5 hours of reaction time, an additional amount of 0.044 grams of azobisisobutyronitrile was added, and the mixture was stirred at a temperature of 60° to 65° C for an additional 1.5 hours. An amount of coagulated product was removed from the resulting emulsion. Water (41 milliliters) was removed from the emulsion by azeotropic distillation with hexane. Then 137 grams of diethylene glycol diethyl ether was added, and the hexane was removed by distillation. Residual hexane was removed by distillation at a reduced pressure, and an additional amount of 85 grams of diethylene glycol diethyl ether was added. There was thus obtained a white, mobile thixotropic dispersion having an active-ingredient content of approximately 21 percent by weight. Dilution of a sample of this dispersion with water resulted in the production of a viscous solution within about 1 minute.

EXAMPLE 2

Example 1 was repeated, except that the amount of sorbitan monostearate was reduced to 7 grams in place of the 9.4 grams used above. Coagulated material was removed from the reaction mixture, and 40 milliliters of water were removed by azeotropic distillation. A total of 228 grams of diethylene glycol diethyl ether was added, and a white, mobile thixotropic dispersion with a calculated polymer content of 21 percent by weight was obtained. Dilution of a sample of this dispersion with water resulted in the production of a viscous solution within about 1 minute.

EXAMPLE 3

Following essentially the procedure indicated in Example 1, acrylamide homopolymer of desirably fine particle size is produced by free-radical-initiated polymerization in a water-in-hexane dispersion, then ethylene glycol is added and the hexane is removed, leaving a compsition of matter containing approximately 20 percent by weight of polyacrylamide, which may be readily dissolved in water and used as a flocculant in accordance with procedures well known to those skilled in the art.

EXAMPLE 4

Following essentially the procedure of Example 1, an anionic flocculant is prepared by copolymerizing 90 parts by weight of acrylamide together with 10 parts by weight of acrylic acid, using cyclohexane as the solvent and sorbitan monopalmitate as the surfactant. After the polymerization and water-removal step, ethylene glycol monomethyl ether (EGME) is added, and then the cyclohexane is removed, leaving a suitable product material containing approximately 18 percent by weight of the copolymer of acrylamide and acrylic acid. There is thus obtained a liquid product which dissolves readily in water and is useful as a flocculant, particularly in applications which require the settling or precipitation of inorganic materials, such as coal fines or mineral ore.

While I have shown and described herein certain embodiments of my invention, I intend to cover as well any change or modification therein which may be made without departing from its spirit and scope.

The embodiments of the invention in which an exclusive property or privilege is claimed are defined as follows:

1. A method of making a liquid and stable flocculant composition containing about 10 to 30 percent by weight of an active-ingredient polymer, said method comprising the steps of polymerizing at least one water soluble ethylenically unsaturated monomeric material in the form of a water-in-oil emulsion containing water, said monomer, a hydrocarbon solvent, and a surface-active agent selected from the group consisting of sorbitan monostearate, sorbitan monooleate, and sorbitan palmitate, and used in conditions of concentration and identity of said surface-active agent, time, temperature, and agitation effective to produce particles of polymer having a maximum dimension on the order of 1 millimicron to 10 microns, whereby a reaction mixture capable of affording a stable suspension is produced, removing substantially all of the water present by azeotropic distillation with the solvent, adding to said reaction mixture a quantity of a glycol material having a boiling point substantially higher than that of said solvent and in an amount sufficient to yield a composition having a content of said polymer on the order of 10 to 30 percent by weight, and finally removing the remainder of such solvent from said reaction mixture by distillation to obtain said flocculant dispersion.

2. A method as defined in claim 1, wherein said monomeric material is acrylamide and said polymer is substantially acrylamide homopolymer.

3. A method as defined in claim 1, wherein said monomeric material comprises approximately 65 to 95 parts by weight of acrylamide and approximately 35 to 5 parts by weight of an acrylate or methacrylate selected from the group consisting of dimethylaminoethylmethacrylate and dimethylaminoethylacrylate.

4. A method as defined in claim 1 wherein said monomeric material comprises approximately 65 to 95 parts by weight of acrylamide and approximately 35 to 5 parts by weight of a substrate selected from the group consisting of acrylic acid and its alkali-metal salt.

5. A method as defined in claim 1, wherein said solvent is hexane.

6. A method as defined in claim 1, wherein said glycol material is one selected from the group consisting of ethylene glycol, propylene glycol, hexylene glycol, and ethylene glycol monomethyl ether.

7. A method as defined in claim 6, wherein said glycol material is ethylene glycol monomethyl ether.

8. A method as defined in claim 6, wherein said glycol material is ethylene glycol.

* * * * *